United States Patent [19]

Hashimoto et al.

[11] Patent Number: 5,477,130
[45] Date of Patent: Dec. 19, 1995

[54] BATTERY PACK WITH SHORT CIRCUIT PROTECTION

[75] Inventors: Hisashi Hashimoto; Mikitaka Tamai, both of Sumoto, Japan

[73] Assignee: Sanyo Electric Co., Ltd., Osaka, Japan

[21] Appl. No.: 261,041

[22] Filed: Jun. 14, 1994

[30] Foreign Application Priority Data

Jul. 7, 1993 [JP] Japan ................................. 5-167945

[51] Int. Cl.$^6$ ................................. H02J 7/04; H02J 7/16
[52] U.S. Cl. ................................. 320/49; 320/2; 320/13; 320/14; 320/15; 320/20; 320/21; 320/29; 320/31; 429/96; 429/97; 429/99
[58] Field of Search ................................. 429/96, 97, 99; 320/2, 13, 14, 15, 20, 21, 29, 31, 49

[56] References Cited

U.S. PATENT DOCUMENTS

| | | | |
|---|---|---|---|
| 3,686,530 | 8/1972 | Bogut | 317/16 |
| 4,394,612 | 7/1983 | Emerle et al. | 320/31 |
| 4,507,368 | 3/1985 | Hashimoto | 429/62 |
| 4,634,936 | 1/1987 | Gentry et al. | 315/307 |
| 5,003,244 | 3/1991 | Davis, Jr. | 320/17 |
| 5,184,059 | 2/1993 | Patino et al. | 320/15 |
| 5,355,072 | 10/1994 | Satsuma et al. | 320/13 |
| 5,363,030 | 11/1994 | Ford et al. | 320/13 |

FOREIGN PATENT DOCUMENTS

| | | |
|---|---|---|
| 59-19336 | 6/1984 | Japan . |
| 63-87769 | 6/1988 | Japan . |
| 4-14361 | 2/1992 | Japan . |
| 4-47257 | 4/1992 | Japan . |

Primary Examiner—Charles L. Bowers, Jr.
Assistant Examiner—Geraldine Letscher
Attorney, Agent, or Firm—Wenderoth, Lind & Ponack

[57] ABSTRACT

Connection between internal batteries and external terminals of the battery pack is controlled by semiconductor switching devices, rather than by switches with mechanical contacts. When the battery pack Is not connected, battery short circuits are prevented by non-conduction of the switching devices. When the battery pack is attached to electrical equipment, a control circuit turns the switching devices on to supply power to the equipment. If the electrical equipment is a battery charger, the switching devices are turned on to supply power to the battery pack.

17 Claims, 7 Drawing Sheets

BATTERY PACK WITH SHORT CIRCUIT PROTECTION

BACKGROUND OF THE INVENTION

This invention relates to a battery pack that can prevent battery short circuits when disconnected from electrical equipment.

Battery packs have an electrode structure that is much more susceptible to shorting than single battery cells. This is because the + and − electrodes are disposed close to each other. Further, since a battery pack connects a plurality of battery cells in series to increase the output voltage, the short circuit current is large. If battery pack electrode terminals are shorted, and excessive current flows, battery performance is markedly degraded. Still further, Joule heating of the batteries and the short circuiting metal gives rise to dangerous conditions.

Battery packs that will not short circuit when disconnected from electrical equipment have been developed to avoid these dangers. These battery packs are disclosed in the following Japanese Patent Publications:

① Japanese utility Model Publication No. 59-19336 issued Jun. 4, 1984;

② Japanese Non-examined Utility Model Publication No. 4-14861 issued Feb. 5, 1992;

③ Japanese Non-examined Utility Model Publication No. 4-47257 issued Apr. 22, 1992; and ④ Japanese Non-examined Utility Model Publication No. 63-87769 issued Jun. 8, 1988.

Disclosure ① cites a battery pack provided with shutters to cover the battery terminals when disconnected from electrical equipment. When the battery pack is attached to electrical equipment, the shutters are moved out of the way from the surfaces of the electrode terminals. Hence, the electrode terminals can connect with the power supply terminals of the electrical equipment. When the battery pack is detached from the electrical equipment, the electrode terminals are covered by shutters and short circuits due to metal contacting the terminals is prevented.

Disclosure ② cites a battery pack which has an internal reed switch. The electrical equipment has an internal magnet to control the reed switch. The reed switch turns on in close proximity to the electrical equipment magnet and turns off when separated from the magnet. When a battery pack with this structure is attached to electrical equipment, the reed switch is turned on by the magnet and electric power is supplied from the batteries to the electrical equipment. Since the reed switch is turned off when the battery pack is detached from the electrical equipment, the batteries cannot short circuit even if metal contacts the electrode terminals.

Disclosure ③ cites a battery pack which has a leaf switch connected in series with the batteries. The leaf switch has a lever which projects out from the casing of the battery pack. When the lever is pushed the leaf switch is turned on, and when the lever is not pushed the leaf switch is off. When the battery pack is attached to electrical equipment, the lever is pushed, the leaf switch is turned on, and electric power is supplied from the batteries to the electrical equipment. When the battery pack is removed from the electrical equipment, the lever is no longer pushed, and the leaf switch is turned off. For this reason, when the battery pack is disconnected from the electrical equipment, the batteries will not short circuit even if metal contacts the electrode terminals.

Finally, disclosure ④ cites a battery pack which has a connection switch with mechanically movable contacts in series with the batteries. The connection switch has two metal plates which can elastically deform. The metal plates are disposed in close proximity and are arranged to be pushed upon by the opening in the casing. When the metal plates are pushed upon by the opening, they make contact to turn the connection switch on. When the metal plates are not pushed upon, they elastically deform and separate to turn the connection switch off. Electrical equipment that use this type of battery pack have projections from the casing opening to apply pressure to the metal plates. Consequently, when the battery pack is attached to the electrical equipment, pressure is applied to the metal plates and the connection switch is turned on, but when the battery pack is removed from the electrical equipment, no pressure is applied to the metal plates and the connection switch is turned off. For this reason, when the battery pack is not attached to the electrical equipment, the batteries cannot short circuit even if metal contacts the electrode terminals.

The prior art battery packs cited in the above disclosures protect against short circuits with three types of structures:

① a cover over the electrode terminals;

② an internal reed switch; and

③, ④ an internal switch with mechanically movable contacts.

Since type ① battery packs are provided with shutters that can slide along the casing, the structure to cover the electrode terminals is complex and expensive. Further, if the shutters malfunction and fail to slide properly, the electrode terminals will not be reliably covered when disconnected from the electrical equipment, and the danger of electrical shorting will exist. On the other hand, failure of the shutters to move to their proper position can result in inability to correctly attach the battery pack to the electrical equipment. Consequently, this configuration has the drawbacks that casing structure is complicated and reliable movement of the shutters over long periods is difficult to obtain.

Since battery packs with configuration ② use reed switches, the above drawbacks are eliminated. In particular, since the reed switch contacts are enclosed in a hermetic glass case, these battery packs have the feature that switching can be performed in an ideal environment with the ambient atmosphere shut out from the contacts. This is because the contacts can be activated by magnetic force. However, since the reed switch contacts are switched by a magnet, it is difficult to obtain a structure capable of switching large currents. This is because it is difficult to make large contacts push together strongly and also reliably separate. Therefore, even though the reed switch can be used effectively for battery packs with low load currents, reed switch lifetime presents a problem when used in battery packs with large charging and discharging currents. In particular, there is no way to use the reed switch in a battery pack containing high capacity batteries which are rapidly charged with high currents.

High current battery packs can use type ③, ④ structures because strong pressure is applied to mechanically movable contacts. However, when strong pressure is applied to the switches movable contacts, the opposing reaction force acts on the battery pack-electrical equipment attachment region. This is because one part of the electrical equipment pushes strongly against the battery pack movable contacts when the battery pack is attached. Consequently, it is necessary to provide a sturdy battery pack-electrical equipment attachment region for this type of battery pack. Since the battery pack attaches to the electrical equipment with one part of the electrical equipment pushing strongly against the battery pack movable contacts, considerable force is required to attach the battery pack. It is also difficult to provide an easily detachable structure since the battery pack and electrical equipment are firmly attached. Further, a structure that switches by pressure on movable contacts has the drawback that contact pressure degrades with use. This is because the shape of the movable contacts gradually deforms with repeated long term application of strong pressure. Therefore, reliable long term operation of the movable contact switch is difficult to obtain, and durability is a problem.

SUMMARY OF THE INVENTION

The present invention was developed to correct the drawbacks of prior art battery packs. It is thus the primary object of the present invention to provide a battery pack that has a battery pack-electrical equipment attachment region that is not complex, can be easily attached and removed from the electrical equipment, can insure proper operation over the long term, and can minimize malfunction even when charging and discharging large currents.

The battery pack of this invention is provided with the following structure to achieve the previously stated object. Semiconductor switching devices are connected in series with the batteries of the battery pack. The semiconductor switching devices are Bipolar Junction Transistors (BJTs), Field Effect Transistors (FETs), Silicon Controlled Rectifiers (SCRs), or other switching elements with no mechanical contacts. The semiconductor switching devices are connected between the battery electrodes and the battery pack electrode terminals. A semiconductor switching device input control terminal is the terminal where a voltage or current signal can be input to switch the device. The input control terminal of a BJT is the base, and the input control terminal of an FET or SCR is the gate. A control circuit is connected to the input control terminals of the semiconductor switching devices. The control circuit senses attachment of the battery pack to the electrical equipment and switches the semiconductor switching devices on. When a battery pack with this structure is attached to electrical equipment, the control circuit turns the semiconductor switching devices on connecting the batteries to the electrical equipment. When the battery pack is removed from the electrical equipment, the control circuit turns the semiconductor switching devices off to protect against short circuits.

DETAILED DESCRIPTION OF THE INVENTION

In the battery pack of this invention, the control circuit turns the semiconductor switching devices on when the battery pack is attached to electrical equipment. In a battery pack that uses FETs as semiconductor switching devices, a "high" signal is output to the FET gates from the control circuit to turn the FETs on when the battery pack is attached to electrical equipment. When the FETs are turned on, the batteries are connected to the electrode terminals via the semiconductor switching devices. In this state, the battery pack batteries supply power to the electrical equipment. When the battery pack is removed from the electrical equipment, the control circuit issues a "low" signal to the FET gates to turn the FETs off. When the FETs are off, the batteries are electrically disconnected from the electrode terminals. Therefore, in this state, even if a conductor such as metal contacts the battery pack electrode terminals, the batteries will not short circuit.

In this fashion, the FET semiconductor switching devices that break the connection between the batteries and the electrode terminals are turned off and on electrically by the control circuit and mechanically movable contacts are not necessary. In other words, a configuration in which pressure is mechanically applied to a switch when attached to electrical equipment, as for prior art battery packs, is not required. Even when charging and discharging are performed at high currents, there is no requirement for strong mechanical pressure forces to switch semiconductor switching devices. This is because the semiconductor switching devices are turned on and off electrically. Furthermore, since switching is done electrically, all failures due to improper contact are eliminated and long term reliable operation is realized.

Embodiments of this invention are described below based on the illustrations. However, the following embodiments are for the purpose of giving concrete examples of the intent of the technology of this invention, and the structure and parts of the battery pack of this invention are in no way restricted to the following.

Figure 1:
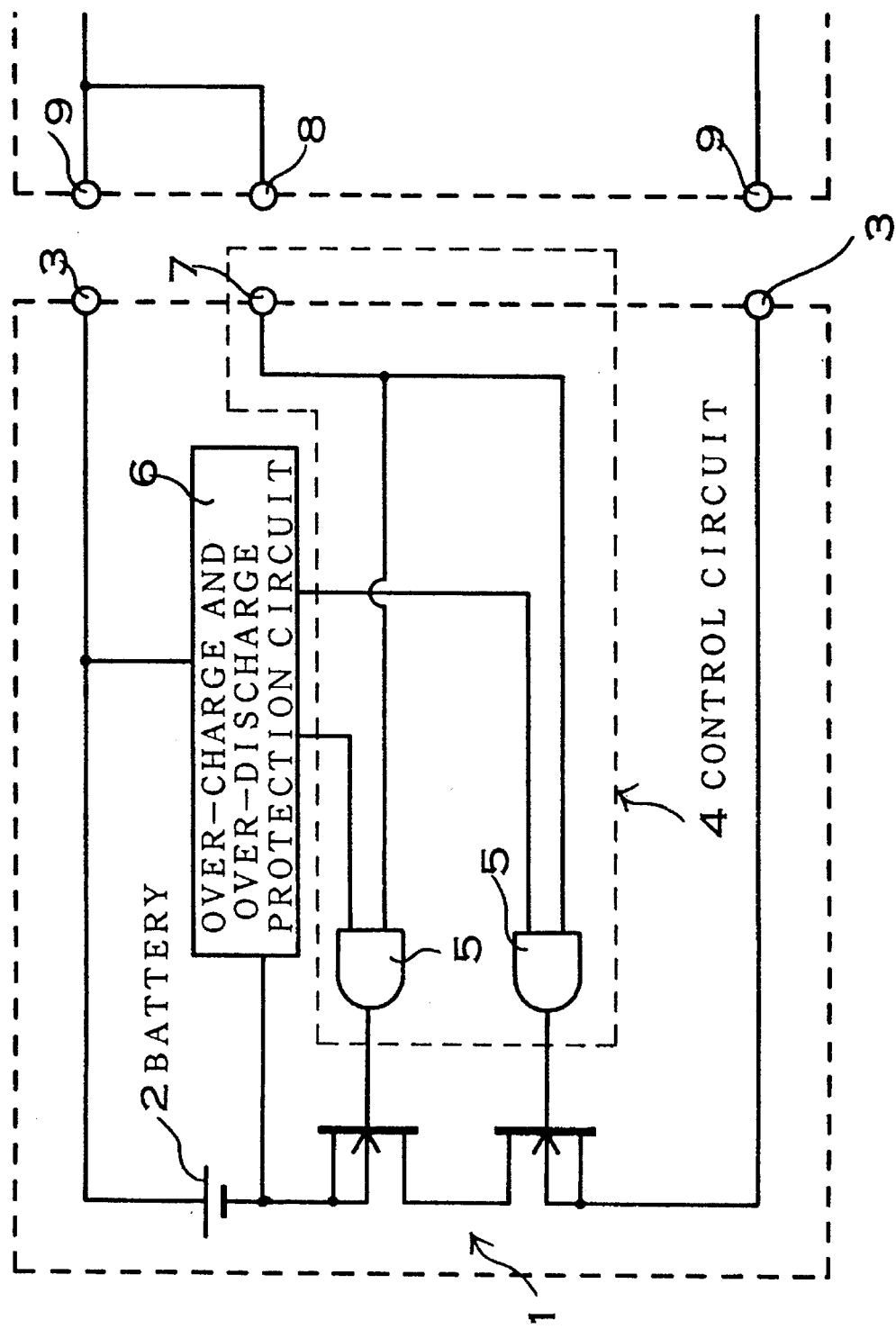
FIG. 1 is a circuit diagram of a battery pack of an embodiment of the present invention.

Turning to FIG. 1, the battery pack shown has semiconductor switching devices 1 connected in series with the battery 2. The semiconductor switching devices 1 are two series connected FETs. The input control terminals, which are the gates of the two FETs, are connected to AND logic circuits 5. The source of the top FET is connected to the electrode of the battery 2, and the drain is connected to the source of the bottom FET. The source of the bottom FET is connected to the side electrode terminal 3. The + electrode of the battery 2 is connected to the + side electrode terminal 3 of the battery pack via a lead wire.

The semiconductor switching devices 1, made up of two FETs, are synchronously turned on and off by the control circuit 4. The control circuit 4 is provided with two AND logic circuits which are respectively connected to the input control terminals or gates of the two FETs. One of the input terminals of each of the two AND circuits 5 is connected to the signal terminal 7 of the battery pack and the other two input terminals are connected to the over-charge and over-discharge protection circuit 6. The output terminals of the AND circuits 5 are connected to with the gates of the two FETs.

The signal terminal 7 of the battery pack is connected to the control terminal 8 of the electrical equipment. The control terminal 8 issues a "high" signal to the signal terminal 7 when the battery pack is attached to the electrical equipment. Consequently, there is an internal connection of the control terminal 8 and the + side power supply terminal 9 of the electrical equipment. When the battery pack is attached to the electrical equipment, one input terminal of the AND circuit 5 is connected to the + side of the battery 2 via the signal terminal 7 and the control terminal 8 to input a "high" signal. The AND circuit 5 turns the FET on if "high" signals are input to both its input terminals and turns the FET off if either of its input terminals are "low". Although it is not illustrated, the bottom FET is controlled on and off by a level shifter connected to the gate terminal which outputs "high" and "low" signals with respect to the source potential.

The over-charge and over-discharge protection circuit 6 outputs a "high" signal to the AND circuit 5 inputs under normal conditions. The over-charge and over-discharge protection circuit 6 only outputs a "low" signal to the AND circuit 5 inputs when it is necessary to protect the battery 2 from over-charging or over-discharging. Therefore, the over-charge and over-discharge protection circuit 6 issues a "high" signal to the AND circuit 5 when the battery pack can be used normally. For this reason, when a "high" signal is input to the AND circuit 5 from the signal terminal 7, both FETs are turned on and power is supplied to the electrical equipment from the battery 2.

In this configuration of battery pack, part of the circuit to protect the battery 2 from over-charge and over-discharge serves the double function of protecting the battery 2 from short circuits. Namely, the FETs connected in series with the battery 2 also act as the semiconductor switching devices for short circuit protection. In other words, this configuration of battery pack has the feature that short circuits can be effectively prevented by adding AND circuits and a signal terminal 7. For a battery pack without over-charge and over-discharge protection, the over-charge and over-discharge protection circuit 6 is omitted from the battery pack shown in FIG. 1. In this case, the signal terminal 7 is connected to the FET gates through buffers and the FETS are controlled on with a "high" signal from the signal terminal 7 and off with a "low" signal.

Figure 2:
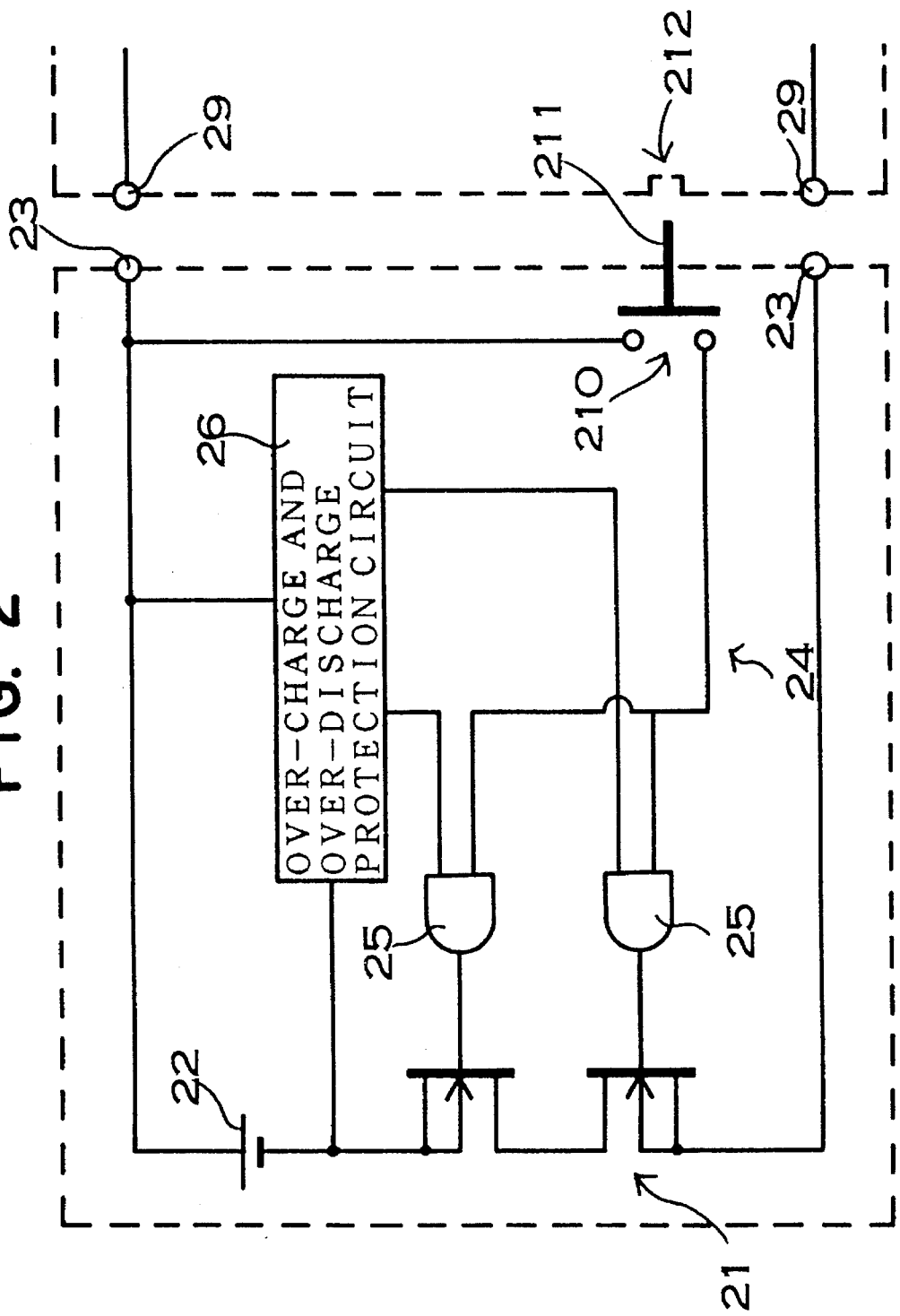
FIG. 2 is a circuit diagram of a battery pack of another embodiment of the present invention.

Turning to FIG. 2, the battery pack shown has a control circuit 24 configured with two AND logic circuits 25 and a detection switch 210 which issues a "high" signal to the AND circuits 25. The detection switch 210 is connected between the + side of the battery 22 and one input terminal of each AND circuit 25.

The detection switch 210 is mounted such that it is on when the battery pack is attached to the electrical equipment and off when the battery pack is removed from the electrical equipment. The detection switch 210 shown in FIG. 2 provided with a pushing stem 211 which is pressed by a pressure seat 212 on the electrical equipment. When the battery pack is attached to the electrical equipment, the electrical equipment pressure seat 212 pushes on the pushing stem 211 to turn the detection switch 210 on. When the battery pack is removed from the electrical equipment, the pushing stem is no longer pushed and the detection switch 210 is turned off. Although it is not illustrated, the detection switch 210 contains flexible material to insure that the switch is off when the pushing stem 211 is not pressed.

The purpose of the detection switch 210 is to issue a "high" signal to the AND circuit 25 of the control circuit 24 and not to directly interrupt battery 2 power transmission. For this reason, an extremely low current switch may be used for the detection switch 210.

When this configuration of battery pack is attached to electrical equipment, the detection switch 210 is turned on. With the detection switch 210 in the on state, one of the input terminals of the AND circuits is connected to the + side of the battery 22 inputting a "high" signal. When the detection switch 210 is off, the input terminals of the AND circuits 25 are not connected to the + side of the battery 22. Hence, one of the input terminals of the AND circuits is in the "low" state.

In the same manner as for the battery pack of FIG. 1, the AND circuit 25 turns the FET semiconductor switching device 21 on if "high" signals are input to both its input terminals and turns the FET off if either of its input terminals are "low". Consequently, when the battery pack is attached to the electrical equipment and the over-charge and over-discharge protection circuit 26 outputs a "high" signal, the battery pack battery 22 supplies power to the electrical equipment. When the battery pack is removed from the electrical equipment, the detection switch 210 turns off and the AND circuits turns the FETs off. Therefore, battery 22 short circuits are prevented with the battery pack disconnected from the electrical equipment.

Figure 3:
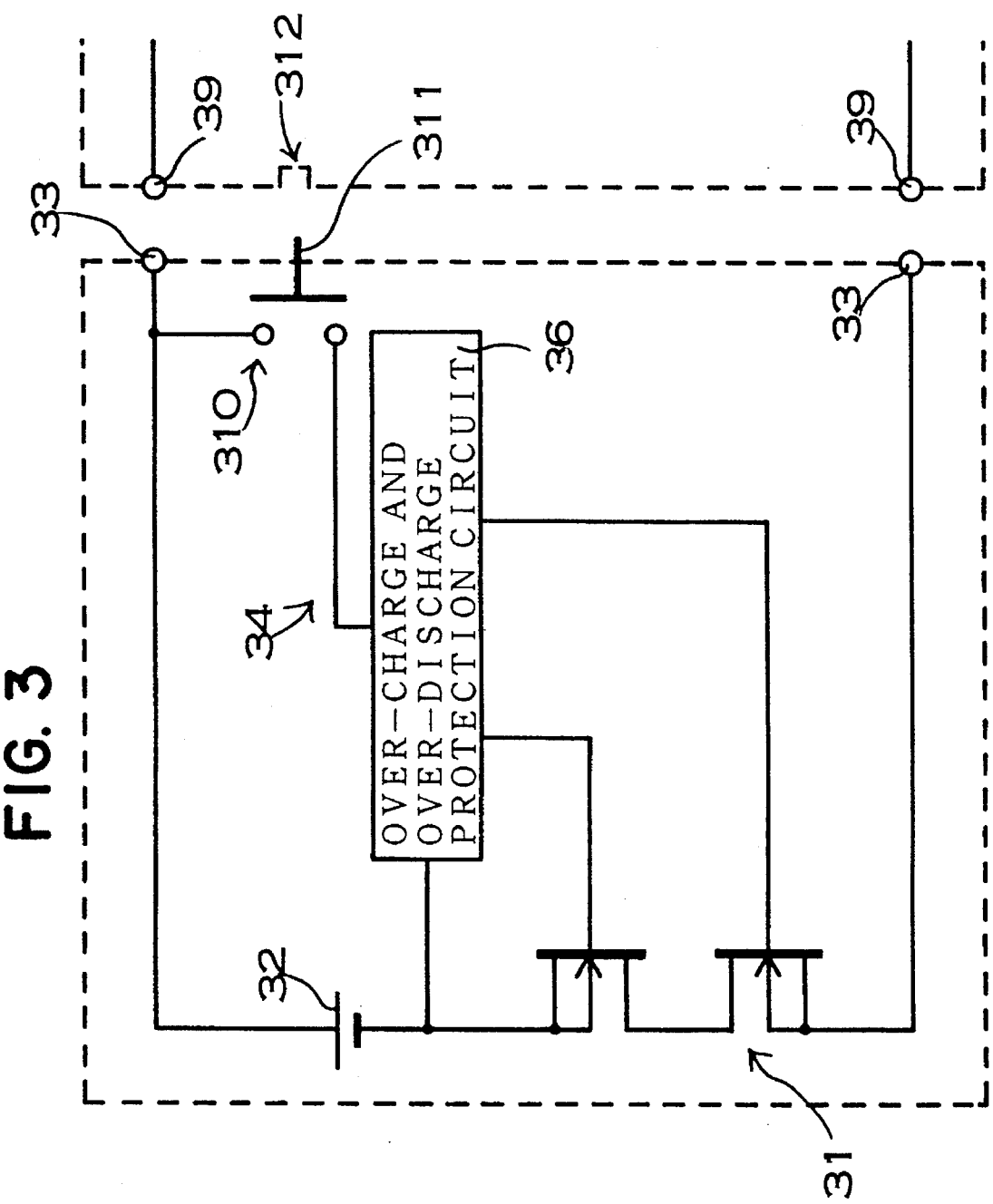
FIG. 3 is a circuit diagram of a battery pack of another embodiment of the present invention.

Turning to FIG. 3, the battery pack shown has a control circuit 34 provided with a detection switch 310 and a over-charge and over-discharge protection circuit 36. Here the detection switch 310 serves as the power switch for the over-charge and over-discharge protection circuit 36. In the same fashion as for the battery pack of FIG. 2, the detection switch 310 turns on when the battery pack is attached to the electrical equipment and off when it is disconnected. When the battery pack is attached to the electrical equipment and the detection switch 310 is turned on power is supplied to the over-charge and over-discharge protection circuit 36.

Consequently, when the battery pack is attached to the electrical equipment, power is supplied to the over-charge and over-discharge protection circuit 36 to activate it normally. If the over-charge and over-discharge protection circuit 36 judges that the battery 32 is not over-charging or over-discharging, it switches the FETs on. When the battery pack is removed from the electrical equipment, the detection switch 310 is turned off and power is not supplied to the over-charge and over-discharge protection circuit 36. In this case, the over-charge and over-discharge protection circuit 36 is not activated normally, and the FETs are maintained in the off state. Therefore, when the battery pack is not attached to the electrical equipment, the FET semiconductor switching devices 31 are in the off state and the battery 32 is protected from short circuiting. With this circuit configuration, when the battery pack is not attached to the electrical equipment, power is not supplied to the over-charge and over-discharge protection circuit 36. Consequently, short circuits are prevented when this type of battery pack is not attached to electrical equipment. Furthermore, unnecessary consumption of battery 32 power is also avoided.

Figure 4:
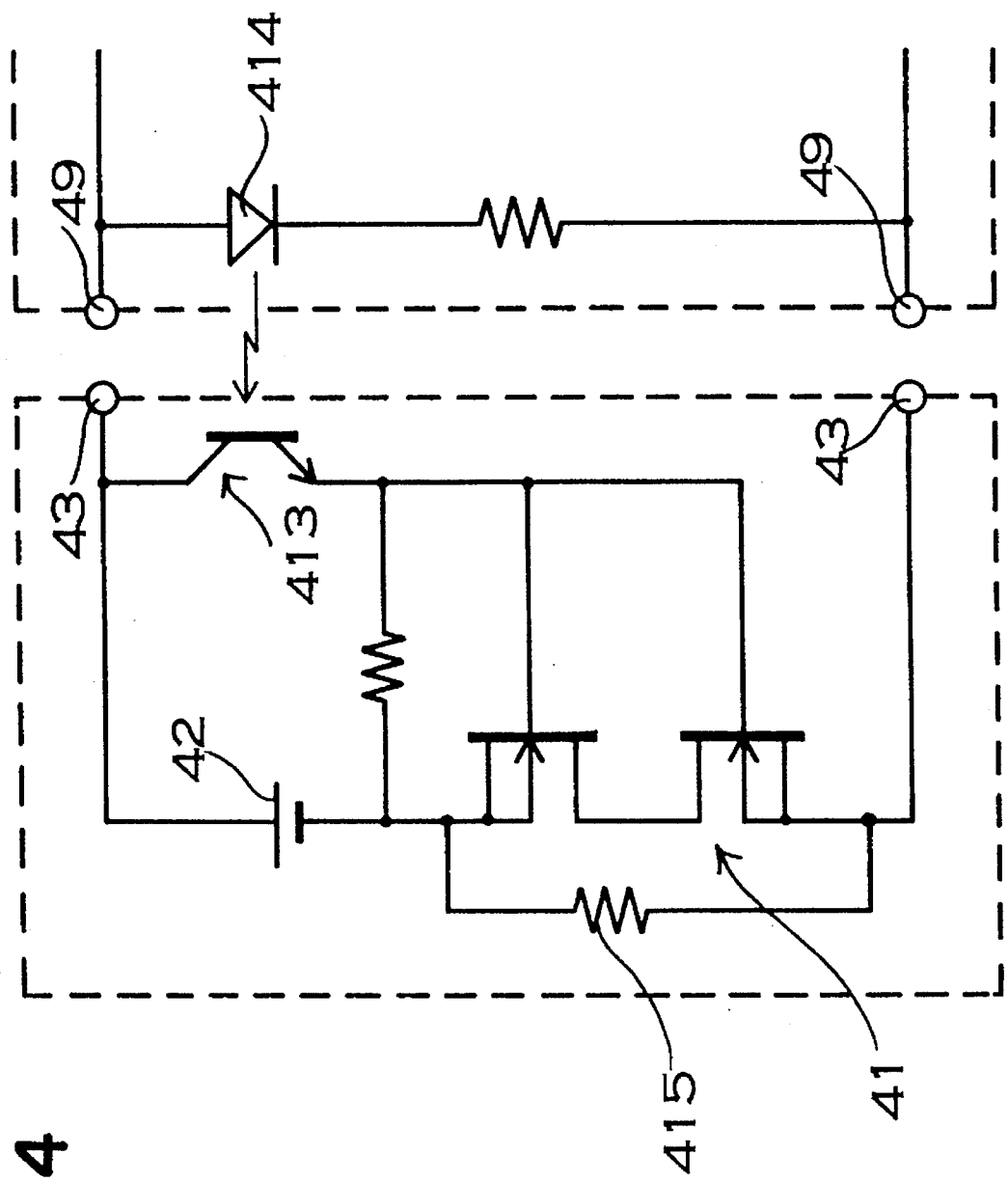
FIG. 4 is a circuit diagram of a battery pack of another embodiment of the present invention.

Turning to FIG. 4, a battery pack with a control circuit 44 made up of a photo-transistor 413 is shown. The photo-transistor 413 is connected between the + side of the battery 42 and the gates of the FETs. When the photo-transistor 413 turns on, the FETs are connected to the side of the battery 42 turning it on. When the photo-transistor 413 is off, the FET gates are not connected to the + side of the battery 42 and the FETs are off.

The photo-transistor 413 is switched on by illumination from a light source within the electrical equipment. The light source to turn the photo-transistor 413 on is a Light Emitting Diode (LED) 414 within the electrical equipment. The LED 414 is turned on with power from the battery 42 when the battery pack is attached to the electrical equipment. The LED 414 ceases to emit light when the battery pack is removed from the electrical equipment.

The LED 414 is connected via a resistor 415 between the and − power supply contacts of the electrical equipment in order to set a specified current flow. Attachment of the battery pack to the electrical equipment results in light emission from the LED 414. Light emission from the LED 414 is necessary even when the semiconductor switching devices 41 are off. This is because when attaching the battery pack to the electrical equipment, the semiconductor switching devices 41 are in the off state until the photo-transistor 413 is turned on. A resistor 415 is connected in parallel with the semiconductor switching devices 41 for the purpose of powering the LED 414 when the semiconductor switching devices 41 are in the off state. The resistor 415 is a large resistance device with a value designed to provide a specified current to the LED 414. The LED 414 uses only a small current to emit light. Therefore, even if the + and – electrode terminals 43 short circuit, the resistor 415 prevents a large short circuit current flowing through the battery.

The battery pack has a window (not illustrated) to allow illumination of the photosensitive region of transistor 413. The LED 414 is mounted on the electrical equipment in a location that allows illumination of the photo-transistor 413 through the window.

When this configuration of battery pack is attached to the electrical equipment, the LED 414 on the electrical equipment emits light. The light from the LED 414 causes the photo-transistor 413 to conduct. The conducting photo-transistor 413 connects the FET gates with the + side of the battery 42 turning the FETs on. Therefore, when the battery pack is attached to the electrical equipment, the battery 42 supplies power to the electrical equipment through the FETs. When the battery pack is removed from the electrical equipment, the photo-transistor 413 no longer receives light from the LED 414 and switches off. Hence, the FETs are switched off. For this reason, when the battery pack and electrical equipment are disconnected, a large short circuit current doesn't flow through the battery 42 even if the + and – electrode terminals 43 are connected by metal or other conductors.

Figure 5:
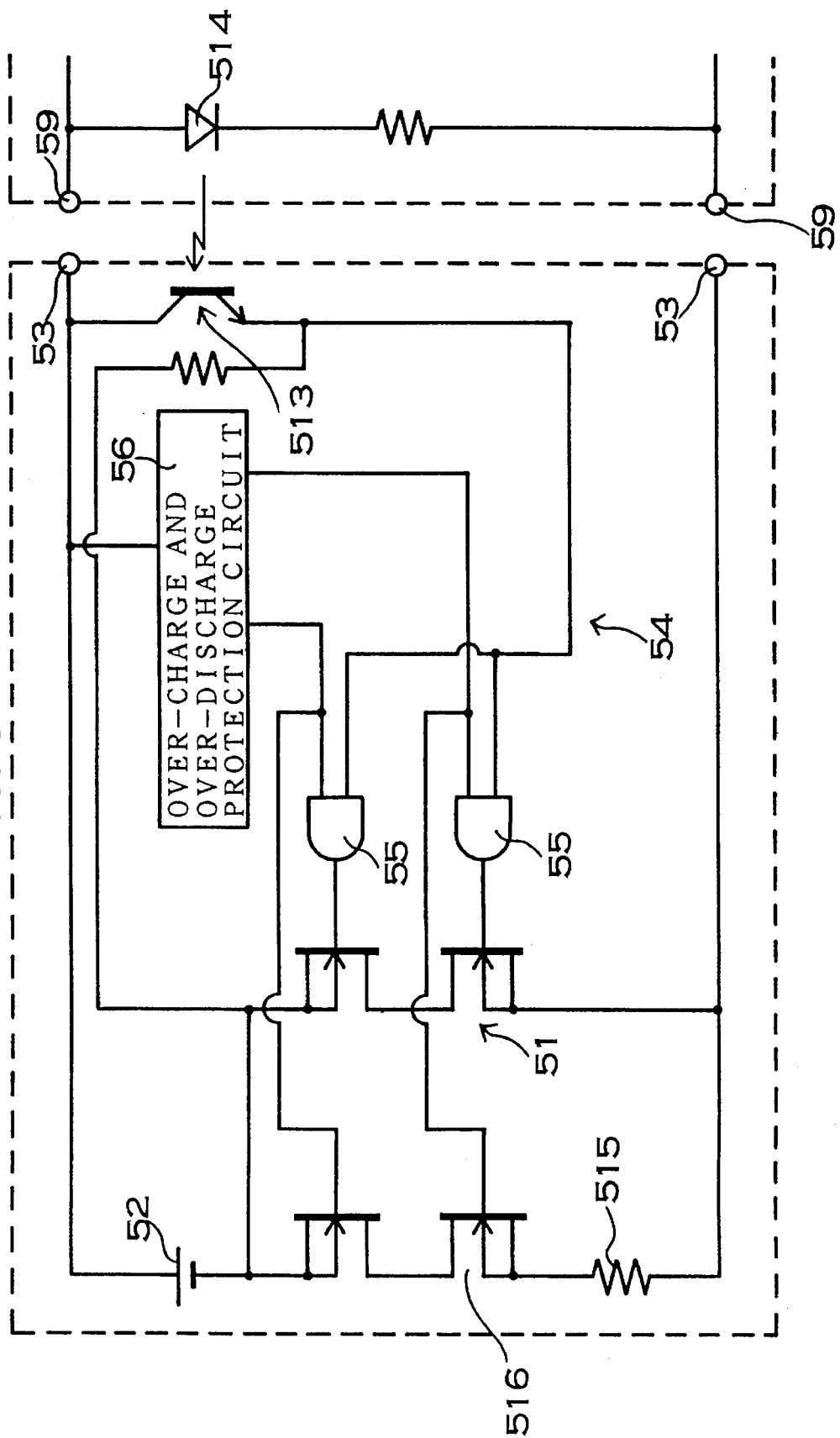
FIG. 5 is a circuit diagram of a battery pack of another embodiment of the present invention.

Turning to the battery pack of FIG. 5, in the same fashion as the battery packs of FIGS. 1 through 3, the circuit to protect the battery 52 from over-charge and over-discharge also serves as part of the circuit to protect the battery 52 from short circuits. The control circuit 54 is made up of AND logic circuits 55 connected between the over-charge and over-discharge protection circuit 56 and the FETs 51, and a photo-transistor 513 connected between the + side of the battery 52 and one of the input terminals of the AND circuits 55. The photo-transistor 513 is switched on and off by illumination from an LED 514 mounted on the electrical equipment in the same manner as shown in FIG. 4. The battery pack also has a resistor 515 for lighting the LED 514. One terminal of the resistor 515 is connected to the - side of the battery 52 through FETs and the other terminal is connected to the - electrode terminal 53. These FETs are on under normal conditions, and when the battery pack is attached to the electrical equipment, a circuit is established through the battery 52, the LED 514, the resistor 515, and the FETs to light the LED 514.

When this type of battery pack is attached to the electrical equipment, the photo-transistor 513 switches on due to light from the electrical equipment LED 514. In the conducting state, the photo-transistor 513 inputs a "high" signal to one side of the AND circuits 55 and the FET semiconductor switching devices 51 turn on. When the battery pack is removed from the electrical equipment, the photo-transistor 513 cannot receive light from the LED 414 and switches off. One side of the AND circuits 55 input terminals then goes "low" switching the FETs 516 off. Consequently, in this state a large short circuit current doesn't flow into the battery 52 even if the + and – electrode terminals 53 are contacted with metal.

Figure 6:
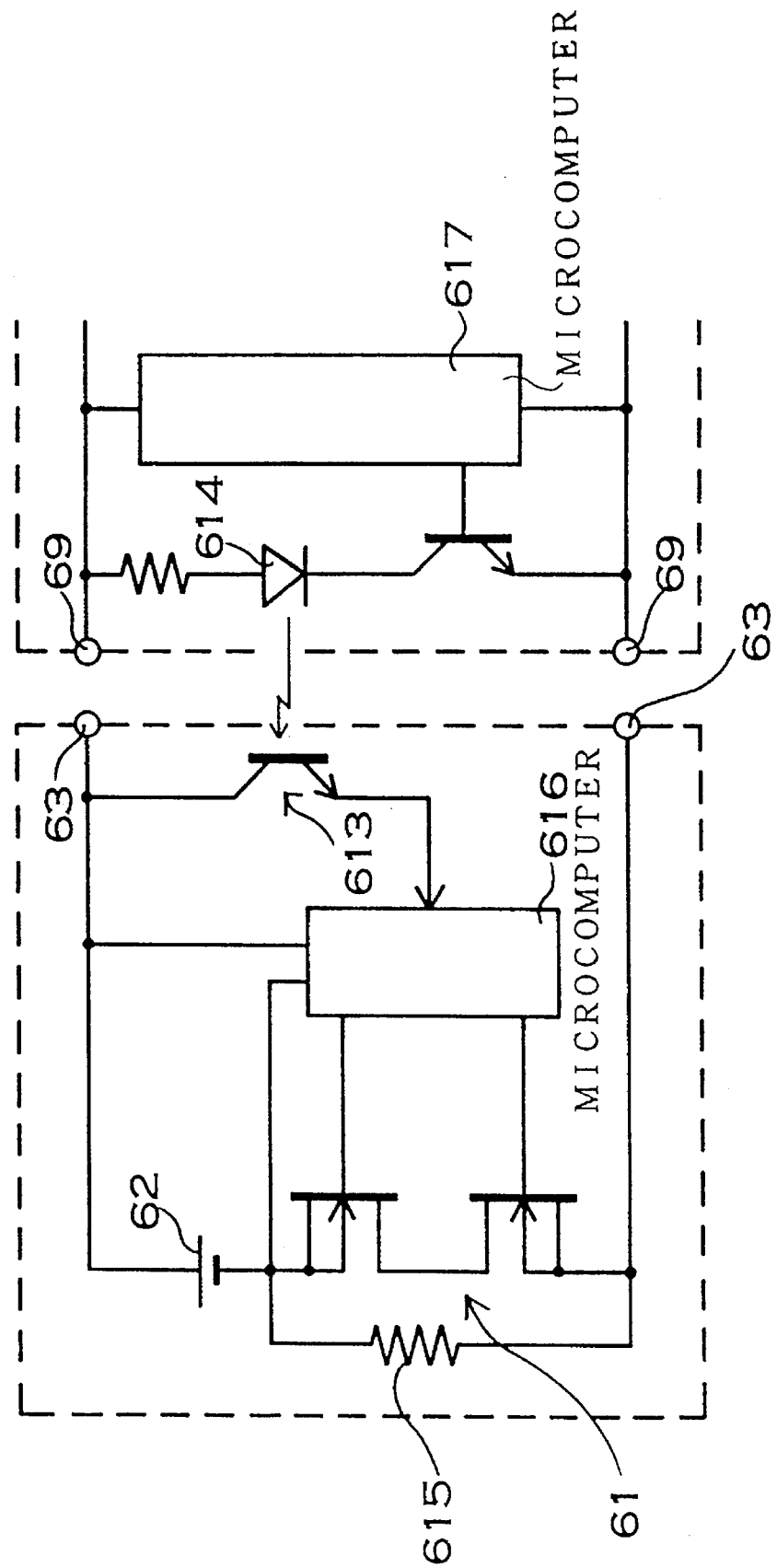
FIG. 6 is a circuit diagram of a battery pack of another embodiment of the present invention.

Turning to FIG. 6, a battery pack is shown with a control circuit 64 made up of a microcomputer 616 and a photo-transistor 613. The photo-transistor 613 is switched on and off by an LED 614 mounted in the electrical equipment in the same manner as shown in FIG. 4. Output from the photo-transistor 613 is input to the microcomputer 616. The microcomputer 616 operates on the input signal from the photo-transistor 613 to control the FET semiconductor switching devices 61 on or off.

In this configuration of battery pack, photo-transistor 613 output is operated on by the microcomputer 616 to switch the FETs on. The microcomputer 616 and the FETs not only prevent battery 62 short circuits, but also allow selection and use of only specified battery packs. The electrical equipment contains a microcomputer 617 which issues a specified output signal to the battery pack microcomputer 616. The electrical equipment microcomputer 617 flashes the LED 614 on and off according to previously stored code patterns. The flashing LED 614 switches the battery pack photo-transistor 613 on and off, and the switching signal from the photo-transistor 613 is input to the battery pack microcomputer 616. The battery pack microcomputer 616 tries to recognize the code pattern sent from the electrical equipment and only when a specified code pattern is distinguished, are the FET semiconductor switching devices turned on. If the battery pack microcomputer 616 does not recognize the code pattern, the microcomputer 616 does not switch the FETs to the conducting state. For this reason, unless the electrical equipment flashes the LED 614 with the previously determined specified code pattern, the battery pack semiconductor switching devices 61 will not turn on. Consequently, the battery pack attached to the electrical equipment is distinguished from others and put into a state that allows it to be used. The semiconductor switching devices 61 of the battery pack are maintained in the off state if the electrical equipment LED 614 does not light or if it does not flash according to the code pattern. Therefore, power is not delivered to the electrical equipment from the battery 62 if the battery pack is not attached to the electrical equipment or if the code pattern is not flashed by 'the LED 614 when attached to the electrical equipment.

Figure 7:
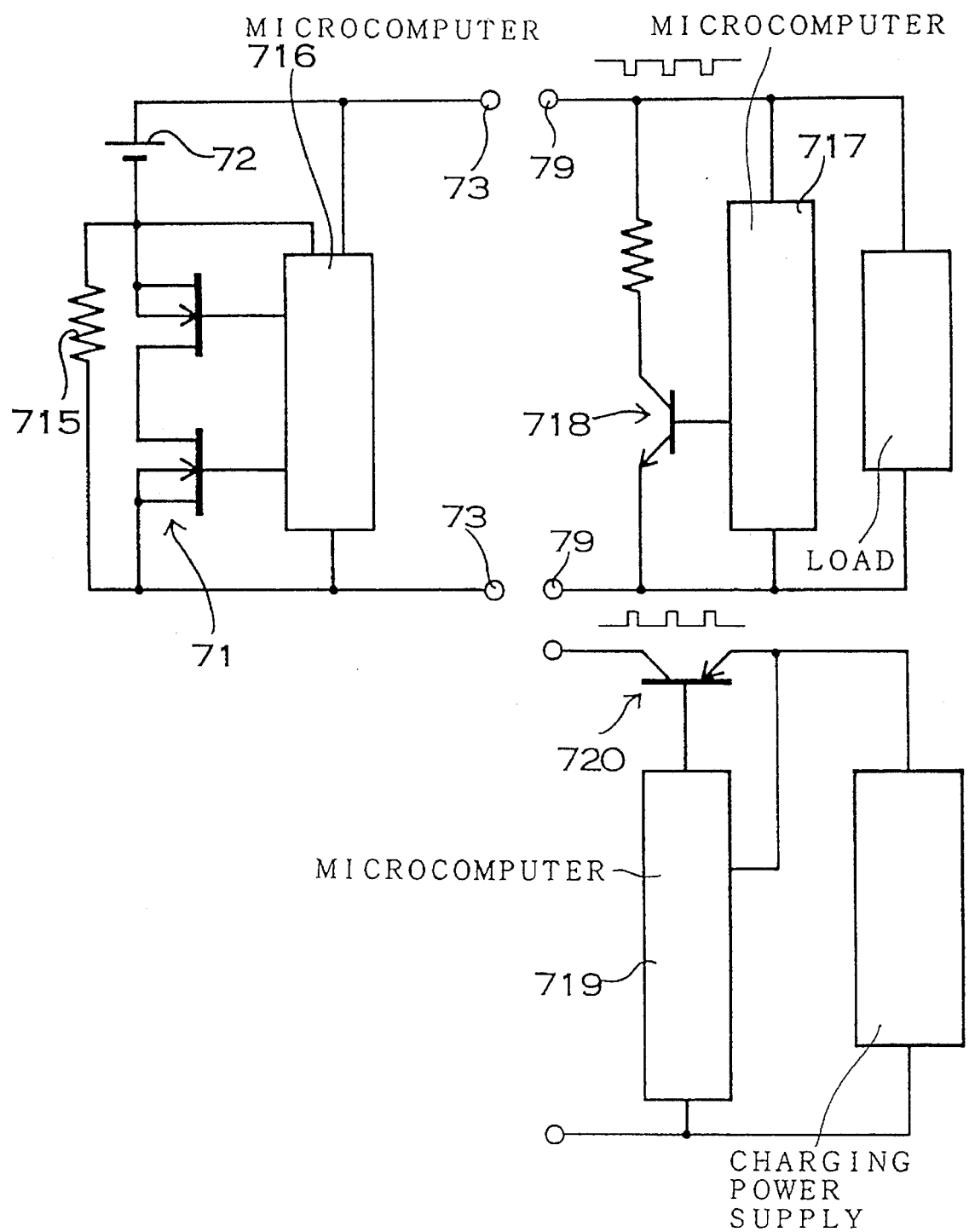
FIG. 7 is a circuit diagram of a battery pack of another embodiment of the present invention.

Finally turning to FIG. 7, instead of an LED and photo-transistor, a pulsed voltage signal is sent from the electrical equipment to the battery pack through the power terminals 79 and the electrode terminals 73. The electrical equipment, which is the load, is provided with a microcomputer 717 controlled switching transistor 718 to send voltage signals from the electrical equipment to the battery pack. When the microcomputer 717 turns the switching transistor 718 on, the voltage at the electrode terminal 73 is lowered, and when the switching transistor 718 is turned off the terminal voltage rises. Therefore, when the microcomputer 717 turns the switching transistor 718 on and off, the terminal 73 voltage varies in a pulse fashion as illustrated. The electrical equipment microcomputer 717 switches the switching transistor 718 according to a pre-stored code pattern. Consequently, the voltage at the electrode terminals 73 varies according to the code pattern.

The voltage variations at the electrode terminals 73 are input to the battery pack microcomputer 716. The battery pack microcomputer 716 tries to recognize the code pattern sent from the electrical equipment through the electrode terminals 73 and only turns the FET semiconductor switching devices 71 on when the code pattern is judged to be a specified pattern. If the battery pack microcomputer 716 determines that the specified pattern has not been sent, the FETs are not turned on. For this reason the battery pack semiconductor switching devices 71 do not turn on unless the switching transistor 718 is switched according to the pre-stored specified code pattern. Consequently, the battery pack attached to the electrical equipment is selected and put in a state allowing It to be used. If the electrical equipment switching transistor 718 does not switch according to the specified code pattern or does not switch at all, the battery pack semiconductor switching devices 71 are maintained in the off state. Therefore, when the battery pack is disconnected from the electrical equipment or when it is attached to electrical equipment that does not switch according to the specified code pattern, power is not supplied from the battery 72 to the electrical equipment.

If the electrical equipment that the battery pack is attached to is a battery charger, as shown in FIG. 7, a switching transistor 720 connected in series with the charging power supply is switched on and off by a microcomputer 719. When the switching transistor 720 of this electrical equipment (battery charger) is turned on, the voltage at the electrode terminals 73 rises, and when the switching transistor 720 is turned off, terminal 73 voltage decreases. The battery pack microcomputer 716 is designed to operate on voltage signals that rise above the normal electrode terminal 73 voltage and those that drop below the normal terminal 73 voltage to discriminate code patterns.

As shown in FIG. 7, the feature of maximum electrode terminal 73 structure simplification is realized when battery 72 short circuits are prevented by sending a code pattern signal from the electrical equipment through the battery pack electrode terminals 73.

As shown in the previous illustrations, battery packs which do not require complex electrical equipment attachment sections, and which have a structure allowing simple, easy, and reliable attachment and removal can be provided. The feature of long term reliable protection against short circuits is also obtained. This is because the battery pack of the present invention has semiconductor switching devices connected in series with the batteries and the semiconductor switching devices are switched by a control circuit that detects attachment of the battery pack to the electrical equipment.

Further, in the battery packs illustrated above, mechanical contact switches connected in series with the batteries are replaced by semiconductor switching devices, and since the semiconductor switching devices are controlled by a control circuit that detects battery pack attachment to electrical equipment, there is no requirement for any high current switches in the control circuit to detect battery pack attachment. The control circuit can control the semiconductor switching devices by electrically detecting battery pack attachment to electrical equipment or by using a low current switch to detect attachment. Consequently, the battery pack to electrical equipment attachment section does not receive any strong reaction forces from switches, and the battery pack has the feature that high current charging and discharging can be controlled with the semiconductor switching devices and battery short circuits are reliably prevented.

What is claimed is:

1. A battery pack with short circuit protection comprising:
    (a) a battery having electrodes;
    (b) at least one semiconductor switching device, having an input control terminal, said semiconductor device being connected in series with the battery;
    (c) electrode terminals, connected through the at least one semiconductor switching device to the battery electrodes; and
    (d) a control circuit, connected to the input control terminal of the at least one semiconductor switching device, for detecting an attachment of the battery pack to electrical equipment and for turning said at least one semiconductor switching device on and off;
    wherein the control circuit turns said at least one semiconductor switching device on when it has detected that the battery pack is attached to the electrical equipment, thereby connecting the battery to the electrical equipment electrically and wherein the control circuit turns said at least one semiconductor switching device off when it has detected that the battery pack is unattached to the electrical equipment, thereby isolating the electrode terminals from the battery to avoid accidental short circuits.

2. A battery pack with short circuit protection as recited in claim 1 wherein the at least one semiconductor switching comprises two series connected Field Effect Transistors (FETs).

3. A battery pack with short circuit protection as recited in claim 1, further comprising an over-charge and over-discharge protection circuit for controlling said at least one semiconductor switching device in addition to said at least one semiconductor switching device being controlled by said control circuit.

4. A battery pack with short circuit protection as recited in claim 3, wherein said control circuit comprises an AND logic circuit having an input side and an output side, said output side of said AND circuit being connected to said at least one semiconductor switching device and said input side connected to said over-charge and over-discharge protection circuit and to a signal terminal of the battery pack, and wherein said control circuit turns said at least one semiconductor switching device on and off by signals from said signal terminal and said over-charge and over-discharge protection circuit.

5. A battery pack with short circuit protection as recited in claim 3, wherein said at least one semiconductor switching device comprises two series connected Field Effect Transistors (FETs), and said control circuit comprises two AND logic circuits which are respectively connected to said two FETs, and wherein input terminals of said two AND circuits are respectively connected to said over-charge and over-discharge protection circuit and to a signal terminal of the battery pack.

6. A battery pack with short circuit protection as recited in claim 1, wherein the control circuit is provided with a detection switch having a pushing stem that is pressed by attached electrical equipment, and wherein said at least one semiconductor switching device is turned on and off by said control circuit in response to the on and off signal from this detection switch.

7. A battery pack with short circuit protection as recited in claim 1, wherein the control circuit is provided with a detection switch and an AND logic circuit, and wherein the detection switch output turns said at least one semiconductor switching device on and off through the AND logic circuit.

8. A battery pack with short circuit protection as recited in claim 7, wherein the control circuit is further provided with an over-charge and over-discharge protection circuit, an output side of both the detection switch and the over-charge and over-discharge protection circuit being connected to an input side of the AND circuit, and an output side of the AND logic circuit being connected to the semiconductor switching device, wherein the detection switch and over-charge and over-discharge protection circuit output cause the control circuit to turn said at least one semiconductor switching device on and off.

9. A battery pack with short circuit protection as recited in claim 1, wherein the control circuit is provided with a detection switch and a over-charge and over-discharge protection circuit which is supplied power through said detection switch, the over-charge and over-discharge protection circuit being connected to said at least one semiconductor switching device, and power being supplied to the over-charge and over-discharge protection circuit when the battery pack is attached to the electrical equipment and the detection switch is turned on, and the over-charge and over-discharge protection circuit causing the control circuit to turn said at least one semiconductor switching device on and off.

10. A battery pack with short circuit protection as recited in claim 1, wherein the control circuit is provided with a photo-transistor that receives light from an electrical equipment light source, and wherein the photo-transistor controls said control circuit so as to cause said at least one semiconductor switching device to be turned on and off.

11. A battery pack with short circuit protection as recited in claim 10 wherein the electrical equipment light source is a Light Emitting Diode (LED).

12. A battery pack with short circuit protection as recited in claim 11, wherein the electrical equipment LED is connected through the electrode terminals to the battery, and when the battery pack is attached to the electrical equipment, the LED emits light by a series connection with the battery.

13. A battery pack with short circuit protection as recited in claim 10, wherein the control circuit is further provided with an AND logic circuit, and an over-charge and over-discharge protection circuit, the photo-transistor and the over-charge and over-discharge protection circuit being connected to said at least one semiconductor switching device through the AND logic circuit, and an output from the photo-transistor and the over-charge and over-discharge protection circuit causing the control circuit to turn said at least one semiconductor switching device on and off through the AND circuit.

14. A battery pack with short circuit protection as recited in claim 1, wherein the control circuit is provided with a microcomputer and the microcomputer controls the control circuit so as to turn said at least one semiconductor switching device on and off.

15. A battery pack with short circuit protection as recited in claim 14, wherein the electrical equipment is also provided with a microcomputer, the electrical equipment microcomputer outputting a specific signal, and the control circuit microcomputer operating in response to said specified signal outputted by the electrical equipment microcomputer to cause said control circuit to turn said at least one semiconductor switching device on and off.

16. A battery pack with short circuit protection as recited in claim 15 wherein the signal transmitted from the electrical equipment microcomputer to the battery pack microcomputer is transmitted by an LED and a photo-transistor.

17. A battery pack with short circuit protection as recited in claim 15, wherein the signal transmitted from the electrical equipment microcomputer to the battery pack microcomputer is transmitted through the electrode terminals of the battery pack.

* * * * *